US010282242B2

(12) United States Patent
Chaganti et al.

(10) Patent No.: US 10,282,242 B2
(45) Date of Patent: May 7, 2019

(54) FAULT DOMAINS AND OPTIMIZATION DOMAINS IN CONVERGED INFRASTRUCTURE INFORMATION HANDLING SYSTEMS

(71) Applicant: Dell Products L.P., Round Rock, TX (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 15/434,073

(22) Filed: Feb. 16, 2017

(65) Prior Publication Data

US 2018/0232256 A1 Aug. 16, 2018

(51) Int. Cl.
*G06F 9/46* (2006.01)
*G06F 11/00* (2006.01)
*G06F 9/50* (2006.01)

(52) U.S. Cl.
CPC ........... *G06F 11/00* (2013.01); *G06F 9/5061* (2013.01)

(58) Field of Classification Search
None
See application file for complete search history.

(56) References Cited

U.S. PATENT DOCUMENTS

| 2009/0119672 A1* | 5/2009 | Bussard | G06F 9/468 |
| | | | 718/104 |
| 2010/0198970 A1* | 8/2010 | Ingle | G06F 11/1482 |
| | | | 709/226 |
| 2015/0261578 A1* | 9/2015 | Greden | G06F 9/5044 |
| | | | 718/1 |

* cited by examiner

*Primary Examiner* — Gregory A Kessler
(74) *Attorney, Agent, or Firm* — Jackson Walker L.L.P.

(57) ABSTRACT

An infrastructure services manager accesses resource description information identifying a plurality of information handling resources and a management endpoint corresponding to each of the resources. Management information for each resource is retrieved from each management endpoint and an infrastructure of the system is determined based on the management information. Placement domains, including optimization domains and fault domains, within the infrastructure are discovered. A domain description document identifying each placement domain, its type, and the server resources included may be generated. The endpoints may be monitored and, when an infrastructure change is detected, placement domains may be re-discovered. The resource description information may be included in a resource description file comprising structured data indicative of the plurality of information handling resources, the management endpoint corresponding to each of the information handling resources and a REST compliant protocol for a discovery interface for each of the information handling systems.

20 Claims, 9 Drawing Sheets

```
{                                                   230
  "FaultDomains" : {                  ~232-1         "OptimizationDomain" : {          ~242-1
    "FD_a08e9d40-109b-450e-a601-ffa8d8e03877" : {      "OD_a08e5640-109b-498e-a601-ffa8765e03877" : {
      "Components" : {                                   "Components" : {
        "Servers" : {    ~233                              "Servers" : {    ~244-1
          "XYZ12345" : {   ~235                              "XYZ12345" : {
            "Model" : "PowerEdge R630",  ~236                  "Model" : "PowerEdge R630",
            "MACAddresses" : [                                 "MACAddresses" : [
              "94-65-9C-5A-B7-1D",  ~237-1                       "94-65-9C-5A-B7-1D",
              "94-65-9C-5A-B7-1C"   ~237-2                       "94-65-9C-5A-B7-1C"
            ],                                                 ],
            "Endpoint" : "172.16.100.17"                       "Endpoint" : "172.16.100.17"
          }                                                  }
        },       ~234                                       }
        "Switches" : {                                     }
          "NVM12101" : {                                 },
            "Model" : "Dell Networking S4048",          "OD_e8a87f3d-9877-f6f4-af13-ea013879b6fb" : {  ~242-2
            "Endpoint" : "172.16.100.101"                "Components" : {
          },                                               "Servers" : {    ~244-2
          "NVM12201" : {                                     "ABC51617" : {
            "Model" : "Dell Networking S4048",                 "Model" : "PowerEdge R630",
            "Endpoint" : "172.16.100.102"                      "MACAddresses" : [
          }                                                      "94-65-9C-5A-B7-1D",
        }                                                        "94-65-9C-5A-B7-1C"
      }                                                        ],
    },                                                         "Endpoint" : "172.16.100.18"
    "FD_e8aa9f3d-9417-46f4-af13-ea013c09b64b" : {  ~232-2    }
      "Components" : {                                     }
        "Servers" : {                                    },
          "ABC51617" : {                               "OD_e8a4242d-9877-f6d4-aa13-aa013879b64b" : {  ~242-3
            "Model" : "PowerEdge R630",                  "Components" : {
            "MACAddresses" : [                             "Chassis" : {    ~243
              "94-65-9C-5A-B7-1D",                           "ABC24617" : {
              "94-65-9C-5A-B7-1C"                              "Model" : "PowerEdge FX2",
            ],                                                 "Servers" : {    ~244-3
            "Endpoint" : "172.16.100.18"                         "XYZN1212" : {
          }                                                        "Model" : "PowerEdge FC630",
        },                                                         "MACAddresses" : [
        "Switches" : {                                               "94-65-9C-5A-B7-1D",
          "NVM12101" : {                                             "94-65-9C-5A-B7-1C"
            "Model" : "Dell Networking S4048",                     ]
            "Endpoint" : "172.16.100.101"                        },
          },                                                     "XYZN1112" : {
          "NVM12201" : {                                           "Model" : "PowerEdge FC630",
            "Model" : "Dell Networking S4048",                     "MACAddresses" : [
            "Endpoint" : "172.16.100.102"                            "94-65-9C-5B-B7-1D",
          }                                                          "94-65-9C-5B-B7-1C"
        }                                                          ]
      }                                                        },
    },                                                         "XYZN1312" : {
    [ADDITIONAL FDS]                                             "Model" : "PowerEdge FC630",
                                                                 "MACAddresses" : [
                                                                   "94-65-9D-5B-B7-1D",
                                                                   "94-65-9D-5B-B7-1C"
                                                                 ]
                                                               },
                                                               "XYZN1012" : {
                                                                 "Model" : "PowerEdge FC630",
                                                                 "MACAddresses" : [
                                                                   "94-65-8C-5B-B7-1D",
                                                                   "94-65-8C-5B-B7-1C"
                                                                 ]
                                                               },
                                                               "Endpoint" : "172.16.100.2"
                                                             }
                                                           }
                                                         }
                                                       }
                                                     }
```

FAULT DOMAINS AND OPTIMIZATION DOMAINS IN CONVERGED INFRASTRUCTURE INFORMATION HANDLING SYSTEMS

TECHNICAL FIELD

The present disclosure relates in general to the management of information handling systems and, more particularly, managing an information handling systems in accordance with the infrastructure of the system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handlings systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resource and so forth.

SUMMARY

A disclosed infrastructure services manager includes features for managing information handling systems. Although applicable to all types of information handling system, infrastructure services manager features may be described in the context of converged infrastructure systems, hyper-converged infrastructure systems, hybrid cloud systems, and other types of enterprise-scale information handling systems, all of which may be collectively or generically referred to herein as managed infrastructure systems. Disclosed infrastructure services manager features include features that address various IT objectives including system consolidation, improved utilization of resources, and lower costs. Managed infrastructure systems support these objectives by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that include one or more modular compute enclosures, one or more network attached storage devices, and one or more switching resource. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's premises-based data center or, increasingly, a third party data center for providing outsourced, co-located, and/or cloud-based IT resources to an enterprise, managed infrastructure systems facilitate consolidation of IT resources and simplify IT management while facilitating improvements in utilization and cost reductions. However, the introduction of readily available, managed infrastructure systems has occurred comparatively recently. Accordingly, resources and techniques for managing the building, deployment, and operation of managed infrastructure systems are yet to be fully implemented and optimized.

Subject matter disclosed in this and other applications address numerous challenges associated with ensuring that: (a) managed infrastructure systems are properly built before being deployed, (b) properly-built managed infrastructure systems are properly deployed, and (c) properly-deployed managed infrastructure systems remain operational and continue to deliver an expected level of performance.

In accordance with a subject matter disclosed herein, a system and method of managing an information handling system includes accessing resource description information identifying a plurality of information handling resources included in the information handling system and a management endpoint corresponding to each of the information handling resources. Management information for each corresponding information handling resource is retrieved from each management endpoint. An infrastructure of the information handling system may be determined based on the management information and placement domains within the infrastructure may be discovered within the infrastructure.

The discovering of placement domains may include identifying and/or defining one or more optimization domains and one or more fault domains. Optimization domains may include a group of one or more information handling resources within which each of a plurality of tiers of an application service may be instantiated such that inter-tier communication is internal to the optimization domain and satisfies a communication performance criterion. A fault domain may comprise a group of two or more independently available information handling resources. The independently available information handling resources may be from the same level of infrastructure granularity including, as examples, two or more rack-level domains, two or more modular-chassis-level domains within the same rack or with different racks, or two or more rack servers within the same or different racks.

Disclosed methods may generate a domain description document comprising structured data identifying the placement domains and, for each placement domain, a domain type and one or more information handling resources included in the domain. Management endpoints may be monitored to detect a change in the infrastructure. Responsive to detecting a change in the infrastructure, placement domains may re-discovered and the domain description document may be regenerated to reflect the infrastructure change.

Accessing the resource description information may include accessing a resource description file comprising structured data indicative of the information handling resources, the management endpoint corresponding to each of the information handling resources, and a representational state transfer compliant (RESTful) protocol for a discovery interface for each of the information handling systems. Retrieving management information from each management endpoint may include invoking a protocol-specific adapter corresponding to the RESTful protocol to provide credentials to the management endpoint to establish a connection with the management endpoint and to request the management information from the management agent.

Identifying an optimization domain may include identifying a plurality of conceivable, i.e., theoretically achievable, optimization domains, wherein the plurality of conceivable optimization domains depends, at least in part, on an environment in which the application service is deployed. Application service may be deployed in an environment a physical deployment environment, a virtual deployment environment, a containerized deployment environment, or other environments.

Selecting a best-achievable optimization domain from the plurality of conceivable optimization domains may be performed in accordance with available information handling resources and any optimization domain constraints. Optimization domain constraints may include an optimization domain constraint requiring symmetry between each of two or more instances of the application service instantiated on independently available resources within the fault domain; and an optimization domain constraint imposed by a requirement for a particular level of the fault domain.

Identifying a fault domain may include identifying a plurality of conceivable fault domains, wherein the plurality of conceivable fault domains depends, at least in part, on an environment in which the application service is deployed, e.g., physical, virtual, and containerized deployment environments. Fault domain constraints may include a fault domain constraint imposed by a requirement for an optimization domain having at least a threshold level of performance.

The plurality of optimization domains may include optimization domains for physical deployments including a single chassis, multiple module optimization domain, wherein the single chassis includes aggregated I/O switching, a single chassis, multiple module optimization domain, wherein the single chassis includes pass-through I/O switching, and a single rack, multiple server optimization domain comprising a plurality of rack mount servers on a common rack. The optimization domains may further include optimization domains for virtual deployments, including a single module optimization domain comprising a single modular server within a modular chassis, a single server optimization domain comprising a single rack mount server, a single chassis, multiple module optimization domain, wherein the single chassis includes aggregated I/O switching, a single chassis, multiple module optimization domain, wherein the single chassis includes pass-through I/O switching, and a single rack, multiple server optimization domain comprising a plurality of rack mount servers on a common rack, and optimization domains for containerized deployments, including a single module optimization domain comprising a single modular server within a modular chassis, a single server optimization domain comprising a single rack mount server, a single chassis, multiple module optimization domain, wherein the single chassis includes aggregated I/O switching, a single chassis, multiple module optimization domain, wherein the single chassis includes pass-through I/O switching, and a single rack, multiple server optimization domain comprising a plurality of rack mount servers on a common rack.

The plurality of default domains include fault domains for physical, virtual, and containerized deployments. Fault domains for physical deployments include: chassis level fault domains, comprising independently operable resources on different modular chassis of a common rack; rack level fault domains, comprising independently operable resources on different racks within a data center; and data center level fault domains comprising independently operable resources on different data centers. Fault domains for virtual deployments including: module level fault domains, comprising independent operable resources on different modular servers of a single modular chassis; chassis level fault domains, comprising independently operable resources on different modular chassis of a common rack; rack level fault domains, comprising independently operable resources on different racks within a data center; and data center level fault domains, comprising independent data center level resources on different data centers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2G, 2G-1, and 2G-2 illustrate a dynamic change of domains following a failure of an information handling resource;

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Figure 1:
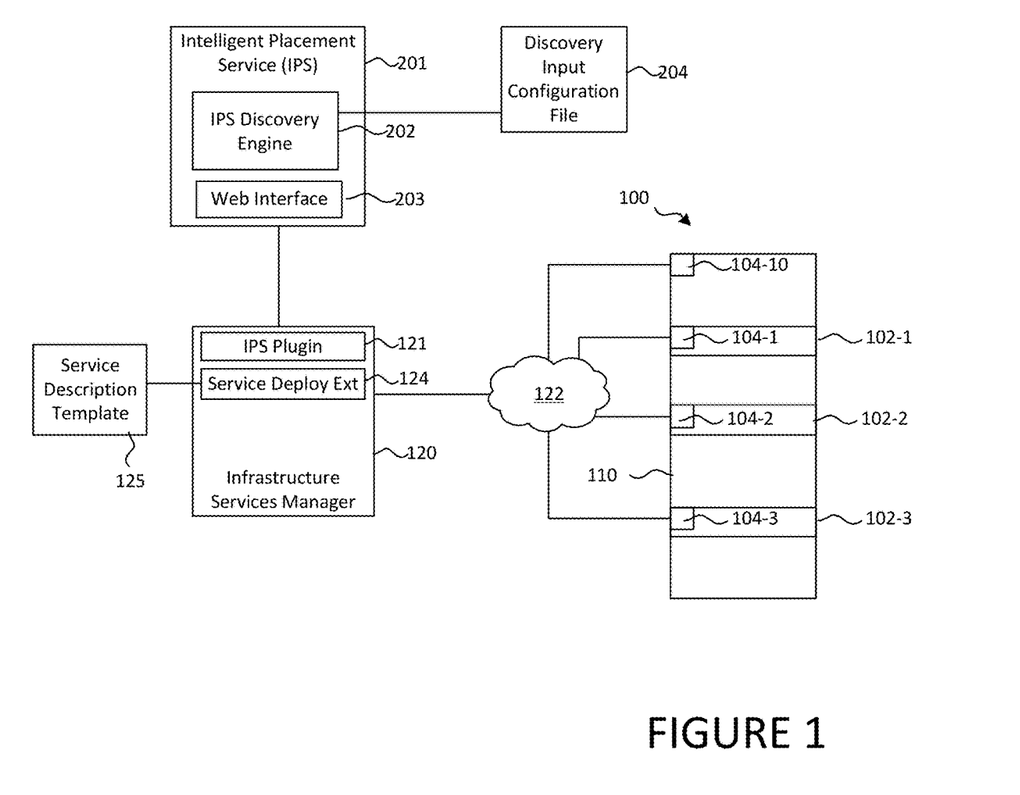
FIG. 1 illustrates a block diagram of a discovery engine for a managed infrastructure system.

Turning now to the drawings, FIG. 1 illustrates a managed infrastructure environment in which a managed infrastructure system 100 is illustrated coupled to an infrastructure services manager 120. The managed infrastructure system 100 illustrated in FIG. 1 includes a plurality of information handling resources 102-1, 102-2, and 102-3 included within a rack, chassis, enclosure, or other type of structural support 110 that information handling resources 102 may share in common.

In converged infrastructure system embodiments of managed infrastructure system 100, information handling resources 102-1, 102-2, and 102-3 may each correspond to different types of information handling resources, provide different functions, and originate from different manufacturers. These disparate and heterogeneous information handling resources may be pre-configured with a validated infrastructure by a supplier or vendor. In converged infrastructure system embodiments, managed infrastructure system 100 may be referred to herein as converged infrastructure system 100.

In hyper-converged system embodiments of managed infrastructure system 100, information handling resources 102-1, 102-2, and 102-3 may represent different instances of a rack server or another off-the-shelf compute component, each of which includes compute resources and direct attached storage. These similar and homogenous information handling resources may be pre-configured with a validated infrastructure by a supplier or vendor. In hyper-converged system embodiments, managed infrastructure system 100 may be referred to herein as hyper-converged system 100. In addition, converged infrastructure system embodiments and hyper-converged system embodiments of managed infrastructure system 100 may be collectively or generically referred to herein as managed infrastructure systems 100.

Although FIG. 1 illustrates an managed infrastructure system 100 with three information handling resources 102, it will be readily appreciated that, whether implemented as a converged infrastructure system, a hyper-converged system, or another type of system, managed infrastructure system 100 may include multiple instances of information handling resources 102-1, 102-2, and/or 102-3, as well as additional types of information handling resources not depicted in FIG. 1.

Whether implemented as a converged infrastructure system, a hyper-converged system or another type of system, the infrastructure of managed infrastructure system 100 may include, in addition to the physical hardware components, any and all software and/or firmware components, including BIOS firmware, operating system software, hypervisor software, and/or containerization software, as well as any management resources on any one or more of the information handling resources 102.

FIG. 1 further illustrates a management resource 104 corresponding to each information handling resource 102, as well as a management resource 104-10 associated with structural support 110. Management resources 104, which may correspond to remote access controllers, baseboard management controllers, or the like, are illustrated coupled to a remote and centralized infrastructure services manager 120 via management network 122, which may include and/or support one or more out-of-band connections between management resources 104 and infrastructure services manager 120.

For embodiments of managed infrastructure system 100 that support virtualized, containerized, or other types of abstracted information handling resources, infrastructure services manager 120 may include or encompass resources for managing such abstracted resources. These resources may include, as examples, infrastructure manager resources, virtual machine resources, or microservice/container clustering and/or orchestration frameworks, depending upon the implementation.

The infrastructure services manager 120 may be configured to interact with one or more management services that may provide infrastructure services manager 120 with information or services that improve the ability of infrastructure services manager 120 to manage managed infrastructure system 100. The infrastructure services manager 120 of FIG. 1 is illustrated coupled to an intelligent placement service (IPS) 201 that includes an IPS discovery engine 202 and a web interface 203 for facilitating communication with external applications. As suggested by its name, IPS 201 may be configured to discover, learn, or otherwise determine information that facilitates the placement of application and/or storage instances and/or workloads to achieve objectives including high availability and high performance.

As depicted in FIG. 1, web interface 203 is coupled to an IPS plugin 121 of infrastructure services manager 120. The IPS plugin 121 may receive intelligent placement information from IPS discovery engine 202. In such embodiments, IPS plugin 121 may be referred to as an IPS consumer.

FIG. 1 further illustrates a service deployment extension 124 configured to enable infrastructure services manager 120 to locate and retrieve one or more service description templates 125 that provide information regarding corresponding application programs. For example, service description template 125 may provide information indicative of the various tiers in a multi-tier application service and the manner in which the various tiers are related to and/or depend on one another.

Figure 2A:
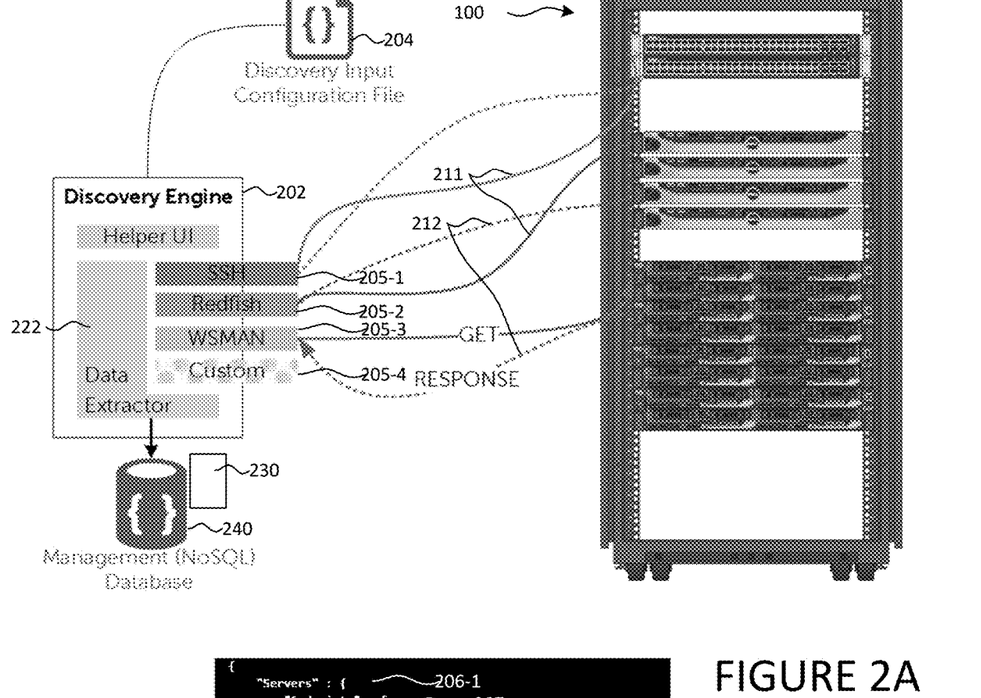
FIG. 2A illustrates the determination and identification of fault domains and optimization domains within a data center.

Turning now to FIG. 2A, a managed infrastructure system 100 is illustrated coupled to a discovery engine 202, which may be implemented as an internal or plugin feature of infrastructure services manager 120. Discovery engine 202 may be configured to discover the infrastructure of managed infrastructure system 100. In at least one embodiment, discovery engine 202 may be particularly configured to discover and identify one or more types of infrastructure domains, which may influence the placement of workloads to achieve one or more deployment objectives including high availability and high performance. Examples of infrastructure domains that discovery engine 202 may discover include domains referred to herein as fault domains and optimized or performance domains. In at least one embodiment, fault domains facilitate highly available placement of resources, workloads, etc. by identifying physical devices that exhibit mutually independent operability such that, as one example, a power disruption of one device in a fault domain does not produce a power disruption of a second device of the fault domain. The discovery engine 202 illustrated in FIG. 2A is configured to access a discovery input configuration file 204. Discovery input configuration file 204 may describe various aspects of the infrastructure of managed infrastructure system 100 including the information handling resources of managed infrastructure system 100 and its infrastructure. In at least one embodiment, a format of discovery input configuration file 204 may comply with JavaScript Object Notation (JSON) or another language-agnostic format.

Figure 2B:
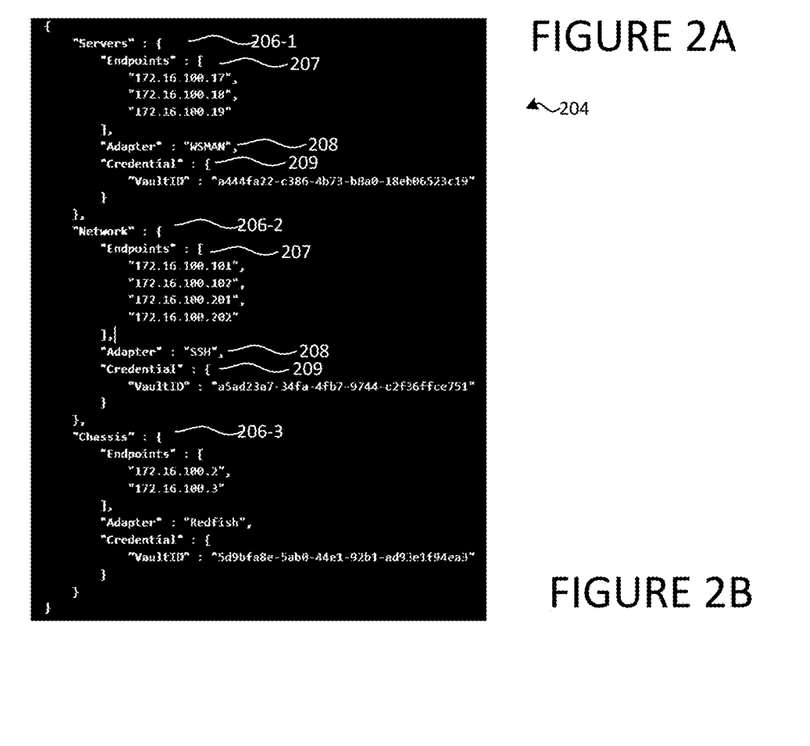
FIG. 2B illustrates a structure of an input configuration file.

An exemplary JSON-formatted discovery input configuration file 204 is illustrated in FIG. 2B. As illustrated in FIG. 2B, discovery input configuration file 204 includes information handling resource type identifiers 206 identifying various types of information handling resources such as server type identifiers 206-1, network type identifiers 206-2, chassis type identifiers 206-3, etc. For each information handling resource identifier 206, discovery input configuration file 204 further includes endpoint information 207, adapter information 208, and credential information 209. Endpoint information 207 may identify one or more management resources by, for example, identifying one or more network address locations for each resource. Adapter information 208 may identify an adapter resource configured to enable discovery engine 202 to communicate various restful requests 211 to various information handling resources of managed infrastructure system 100 and receive responses 212 from the various information handling resources of managed infrastructure system 100.

Accordingly, FIG. 2A illustrates discovery engine 202 engaging in RESTful communication with target devices in the infrastructure and gathering infrastructure data including, in at least one embodiment, fault domain (FD) information and optimization domain (OD) information indicative of the fault domains and optimization domains inherent in the infrastructure of managed infrastructure system 100.

Discovery engine 202 may be configured to retrieve adapter information 208 corresponding to each type identifier 206 and to invoke the applicable discovery adapter 205 to communicate with one or more endpoints identified by endpoint information 207 of managed infrastructure system 100 to gather management data from the applicable information handling resource.

A data extractor service 222 may receive raw output from each discovery adapter 205. Data extractor service 222 may correlate or otherwise analyze the raw output to determine how information handling resources 102 and managed infrastructure system 100 are connected. After correlating the resource adapter output and identifying the fault domains and optimization domains, the data extractor service 222 may generate a domain description document 230, again compliant with a format such as JSON, that conveys the fault domain/optimization domain details of the system.

Figure 2C:
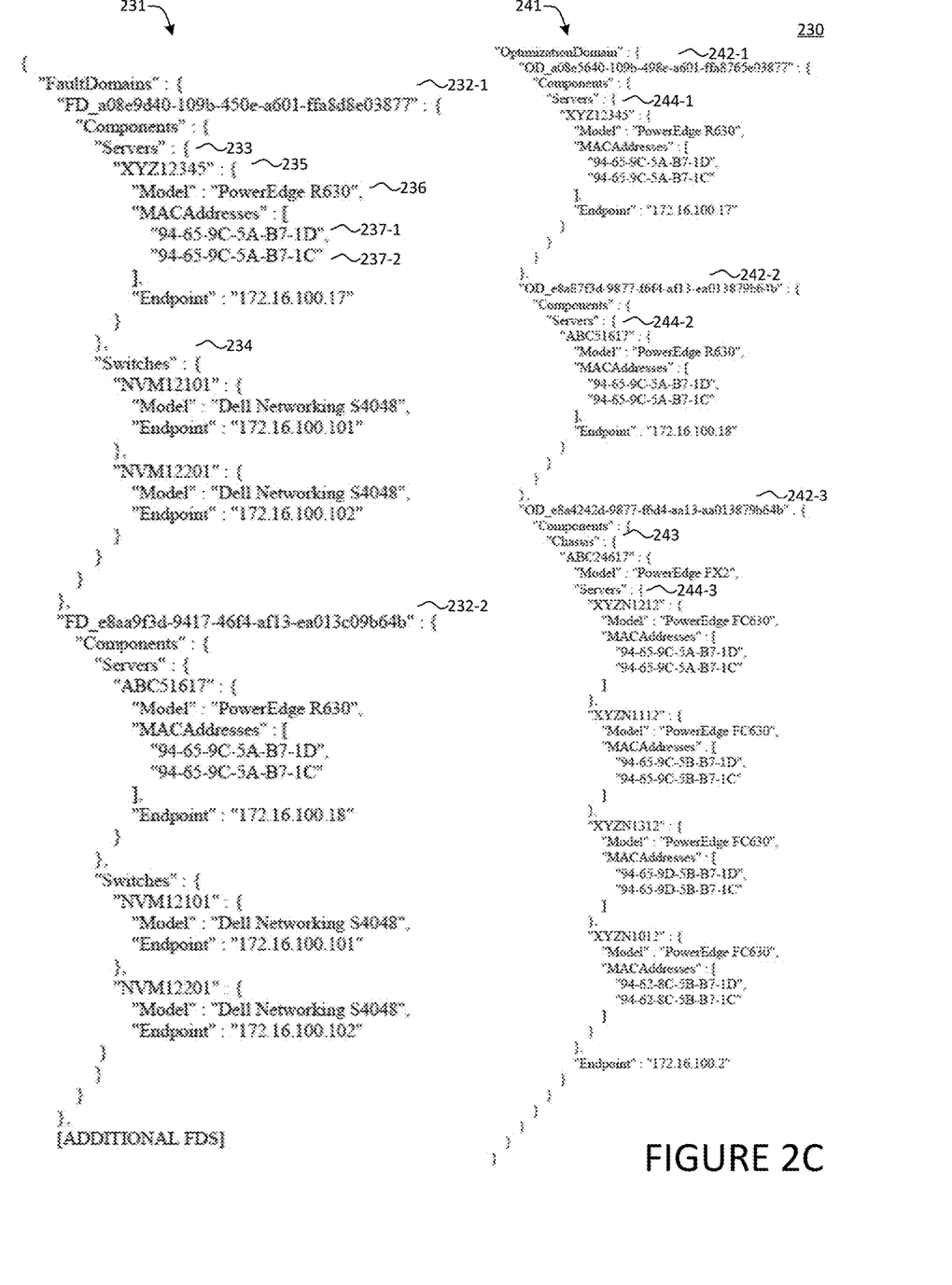
FIG. 2C illustrates an exemplary domain discovery document.

An exemplary domain description document 230 is illustrated in FIG. 2C. The illustrated domain description document includes a fault domain portion 231 identifying fault domains 232 and an optimization domain portion 241 identifying optimization domains 242. The description of fault domains 232 set forth in fault domain portion 231 identifies the servers 233 and switches 234 that comprise the corresponding fault domain 232. The description of the optimization domains 242 set forth in optimization domain portion 241 identifies chassis 243 and/or servers 244 for each optimization domain. For each instance of any type of information handling resource, the domain description document 230 includes a unique identifier 235 for each instance of a particular resource, a model description 236, and one or more media access control (MAC) addresses 237. The data extractor may store the domain description document 230 in a management database 240, which may comprise a NoSQL database.

In at least one embodiment, discovery engine 202 includes, invokes, or otherwise executes a fault domain/ optimization domain identification algorithm that facilitates the identification of fault domains and optimization domains in managed infrastructure system 100. optimization domain determinations may depend on the manner in which the multi-tiered application is deployed. Because containerized deployments can include multiple virtual machines per physical server and each virtual machine may execute a distinct tier of the multi-tier application, a single physical server can serve as an optimization domain for containerized deployments. On the other hand, because physical and virtualized deployments have a 1:1 correspondence between physical servers and application tiers, a single physical server cannot serve as an optimization domain for physical and virtualized deployments.

According to at least one embodiment of an optimization domain/fault domain determination algorithm, if a discovered endpoint is a rack server, it becomes an optimization domain for containerized deployments and an fault domain-eligible element, i.e., an independently available element that may be combined with one or more other independently available element(s) to define a high availability fault domain.

If a discovered endpoint is a modular chassis, the modular chassis is a fault domain-eligible element at the chassis level, i.e., the modular chassis and a second modular chassis may define a fault domain wherein the operability of one chassis is mutually independent with the operability of the other element. If the modular information handling resources in the chassis are interconnected with one or more I/O aggregators, the chassis is an optimization domain for physical, virtualized, and containerized deployments. On the other hand, if the information handling resources of a modular chassis are interconnected with pass-through connects, the chassis is an optimization domain only with respect to containerized deployments.

Each server blade or other server enclosure within an IO-aggregated chassis is identified as a blade level fault domain-eligible element and an optimization domain element for containerized deployments. For virtualized and physical deployments, individual blade enclosures do not constitute an optimization domain because any communication to or from the application tier instantiated on the physical blade would necessarily traverse the blade enclosure boundary.

If a discovered endpoint is a modular chassis and the chassis contains pass-through IO modules, then the chassis will be identified as a fault domain-eligible element at the blade and chassis levels. For containerized deployments, the pass-through blade and the chassis are both optimization domains. For physical and virtualized deployments, neither the chassis nor the individual blade servers constitute an optimization domain.

In addition, the rack servers, modular chassis, and the switches within a given rack constitute a separate rack-level optimization domain/fault domain at least with respect to containerized deployments. For physical and virtualized deployments, the rack level system may constitute an optimization domain if the rack contains sufficient compute resources to accommodate the number of application tiers.

Figure 2D:
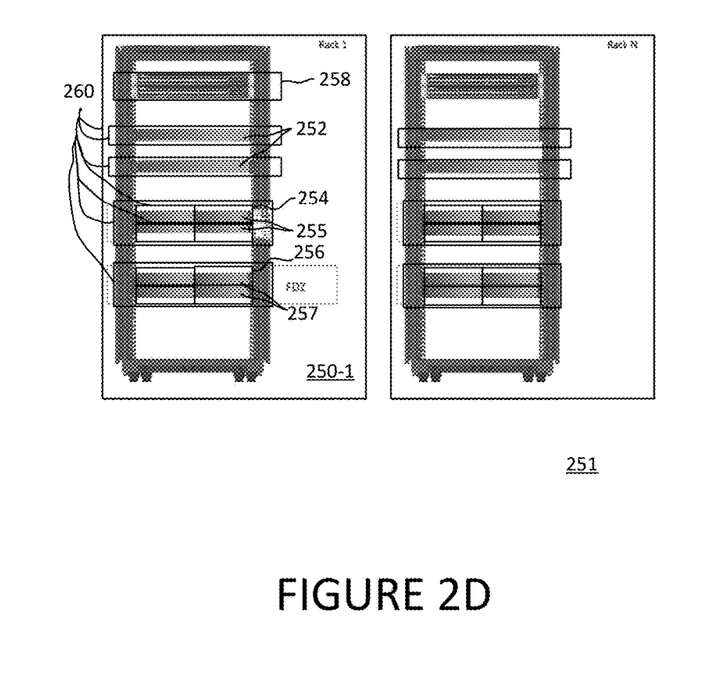
FIG. 2D illustrates optimization and fault domains discovered on a set of rack servers.

FIG. 2D illustrates two racks, 250-1 and 250-n, from a group of "n" racks in a multi-rack data center 251. Both of the racks 250 are illustrated provisioned with various components including, as non-limiting examples, one or more rack servers 252, one or more I/O aggregated modular chassis 254, i.e., a modular chassis that includes an I/O aggregator (not depicted explicitly), including one or more modular servers 255, and one or more pass-through modular chassis 256, i.e., a modular chassis that includes a pass through module, including one or more modular servers 257, as well as a "top of rack" network switch 258. FIG. 2D also illustrates domain spaces 260, each of which corresponds to an individual server or a group of multiple servers that share a common rack, chassis, or other enclosure. The domain spaces 260 illustrated in FIG. 2D include server-level domain spaces, chassis-level domain spaces, and rack-level domain spaces. Each domain space 260 may represent an FD-eligible domain space, an optimization domain space, or both, depending upon the domain determination algorithm employed, the infrastructure details, and the deployment environment, e.g., physical, virtual, or containerized.

Figure 2E:
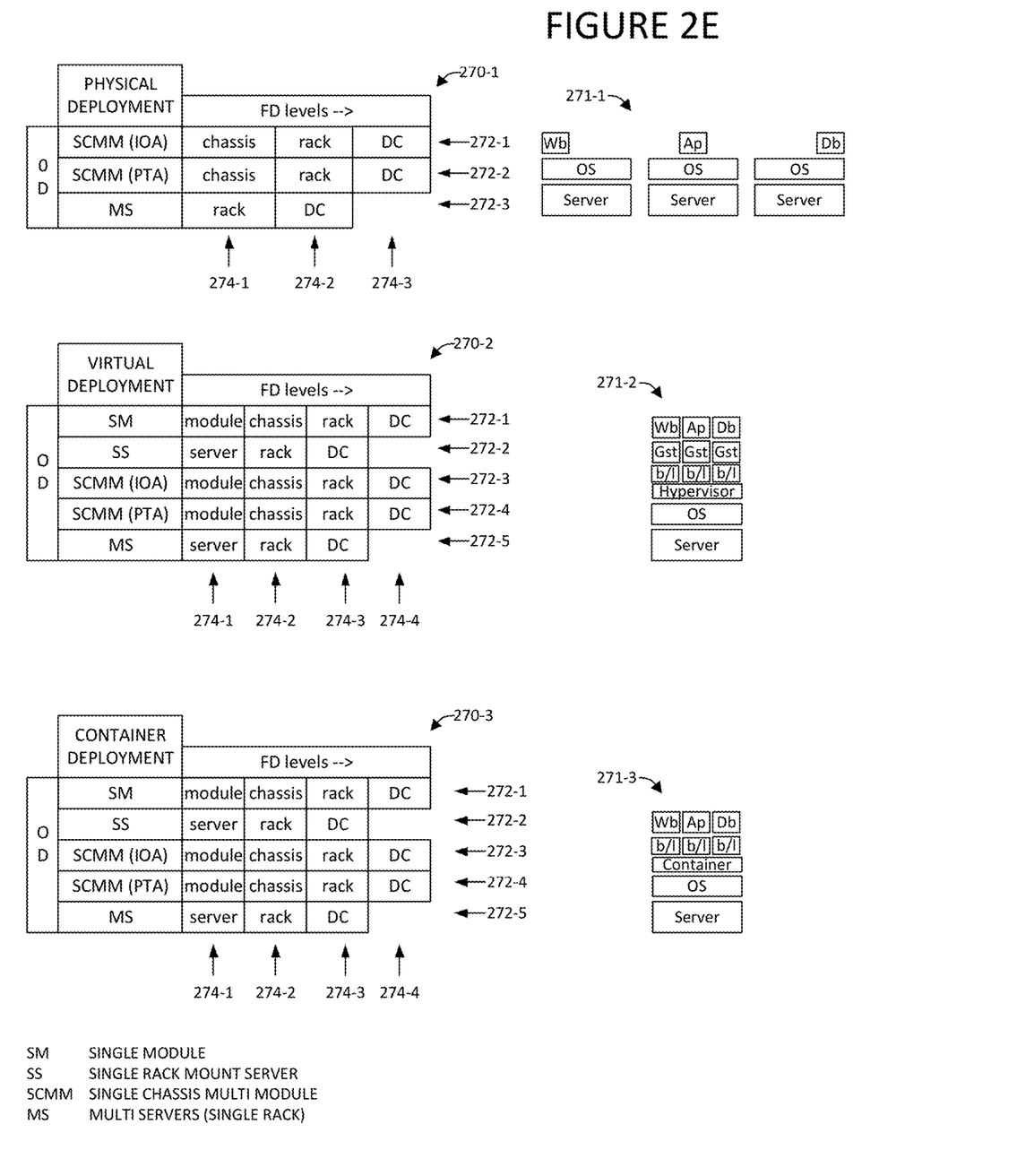
FIG. 2E illustrates matrices of optimization domains and fault domains for various placement deployments of a multi-tiered application service to achieve high availability and performance objectives.

FIG. 2E illustrates optimization-fault domain matrices 270-1, 270-2, and 270-3 for pursuing domain aware placement of an exemplary multi-tier application service to achieve the best case placement consistent with performance and high availability objectives. Each optimization-fault domain matrix 270 illustrated in FIG. 2E corresponds to a different deployment environment. Specifically, optimization-fault domain matrix 270-1 corresponds to a physical deployment, an example of which is depicted as physical deployment 271-1, optimization-fault domain matrix 270-2 corresponds to a virtual deployment 271-2, and optimization-fault domain matrix 270-3 corresponds to a containerized deployment 271-3. The deployments 271 illustrate various placement of application tier instances for an example application service that includes a Web front end module, a processing module, and a database module. Other application services may include more, fewer, or different tiers or modules.

Each optimization-fault domain matrix 270 lists possible optimization domain configurations 272-1 through 272-n vertically with the top most optimization domain configuration 272-1 representing the highest performing optimization domain. Thus, as an example, the single chassis multi-module (SCMM) optimization domain 272-1, corresponding to a chassis with I/O aggregation switches, is identified as the highest performing optimization domain for a physical deployment of the exemplary multi-tier application service. The ordering of optimization domains illustrated in FIG. 2E from top to bottom may include implementation-specific details that may vary from among different implementations. As an example, although FIG. 2E differentiates between the performance of a virtualized, single server optimization domain and a virtualized SCMM/ IOA optimization domain, as conveyed by the distinction between optimization domain configurations 272-2 and 272-3 in optimization-fault domain matrix 270-2, some embodiments may treat these two configurations as substantially equivalent from a performance perspective, effectively merging the distinction between optimization domain configuration 272-2 and optimization domain configuration 272-3.

Continuing with the description of the optimization-fault domain matrices 270 illustrated in FIG. 2E, a list of possible fault domain configurations 274-1 through 274-$n$ are set forth for each optimization domain configuration 272. Each fault domain configuration listed identifies the granularity or separation of each instance of the applicable application service. For example, the fault domain configuration 274-2 associated with optimization domain configuration 272-2 (single server) for the container deployment optimization-fault domain matrix 270-3, indicates that a first and second instances of the exemplary application service are placed on different racks of a single data center. This fault domain configuration represent an intermediate fault domain configuration, between the server fault domain configuration 274-1, i.e., first and second instances are placed on different servers of a single rack, and the data center (DC) fault domain configuration 274-3, i.e., first and second instances are placed in two different data centers.

An intelligent, domain-aware placement algorithm or process may access one or more data structures containing the information conveyed by the optimization-fault domain matrices 270 illustrated in FIG. 2E.

Specifically, an intelligent placement service may attempt to place two or more instances of a multi-tier application service in a manner that achieves best case fault domain configuration as well as a best case optimization domain configuration. For example, in a virtualized deployment environment, an intelligent placement process may attempt to place a first instance of the application service in a single module (SM) optimization domain configuration 272-1 and a second instance of the application service in an SM optimization domain configuration 272-2 within a different data center in accordance with the best case fault domain configuration 274-4 illustrated in FIG. 2E for optimization-fault domain matrix 270-2.

In the event that the applicable infrastructure does not support a dual best-case implementation, i.e., an implementation that achieves a best case optimization domain configuration as well as a best case fault domain configuration, the intelligent placement process may constrain one of the two parameters, performance or availability, and optimize the remaining parameter. As an example, an intelligent placement service may place a minimum constraint on performance and implement the best achievable fault domain configuration that is consistent with the performance constraint. Conversely, if availability is a paramount consideration, the intelligent placement service may constrain or require a best case fault domain configuration and place the application service instances in accordance with the best achievable optimization domain configuration.

Embodiments of an intelligent, optimization and fault domain-aware placement service may support two or more modes of placement, including a symmetric placement mode and an asymmetric placement mode. In a symmetric placement mode, the optimization domain configuration is constrained such that each instance of the application service has the same level of optimization domain configuration. If a first instance is placed within infrastructure that supports a "level 1" optimization domain configuration, i.e., the applicable optimization domain configuration 272-1, but the second instance is placed within infrastructure within which the best achievable optimization domain configuration is a level 2 configuration, the placement may force a placement of the first instance that is sub-optimal with respect to optimization domain configurations in order to achieve the desired performance symmetry between the two instances.

Conversely, an asymmetric placement approach may permit each instance of an application service to be placed in the best achievable optimization domain configuration without regarding to maintaining optimization domain symmetry between or among different instances.

FIG. 2E is intentionally simplified for the sake of clarity. For example, FIG. 2E reflects an assumption that the only information handling resources available as infrastructure include rack mount servers, rack mount modular chassis, including one or more server modules, provisioned with I/O aggregation switches, and rack mount modular chassis, including one or more server modules, provisioned with pass-through I/O adapters. Those of skill in the field will recognize that a data center may employ more, fewer, or different types of information handling and that the intelligent placement service may be modified accordingly, in accordance with the performance and configuration characteristics of any such resource.

Similarly, although FIG. 2E illustrates a simplified view of the placement options for a multi-tier application service for any given deployment, the optimization-fault domain matrices 270 may be supplemented to reflect a greater number of achievable placements for any given deployment. For example, although optimization-fault domain matrix 270-2 indicates that there are only five possible optimization domain configurations for a virtualized deployment of the exemplary multi-tier application service, other embodiments may recognize more, fewer, and/or different optimization domain configurations for any one or more of the deployments represented by optimization-fault domain matrices 270-1, 270-2, and 270-3 In addition, although FIG. 2E reflects similarity between the virtualized optimization-fault domain matrix 270-2 and the containerized optimization-fault domain matrix 270-3, other implementations may differentiate between the optimization domain and fault domain configurations available in a virtualized deployment environment versus the a containerized deployment.

FIG. 2E indicates that, regardless of the type of server resource, whether rack server, modular chassis, or blade resource, each server resource represents an optimization domain and a fault domain-eligible resource for containerized deployments of the application service. FIG. 2E further illustrates that every server resource, whether rack server, modular chassis, or chassis blade, represents a fault domain-eligible resource, but the only server resource that represents an optimization domain for physical or virtual deployments is an I/O-aggregated chassis.

The infrastructure discovery and awareness described above enables an optimized initial placement of application services. In addition, once the initial placement is complete, disclosed embodiments may monitor for any changes in the infrastructure and, upon detecting any one or more particular infrastructure changes, trigger a fault domain/optimization domain re-calculation and a re-determination of placement for some or all application services managed by the management resource.

Accordingly, embodiments may monitor a managed infrastructure system for infrastructure changes, including changes associated with a faulty endpoint and re-discover the infrastructure and re-execute optimization domain/fault domain identification in a proactive manner following a detected infrastructure change. A management database may be updated and IPS consumers notified.

Figure 2F:
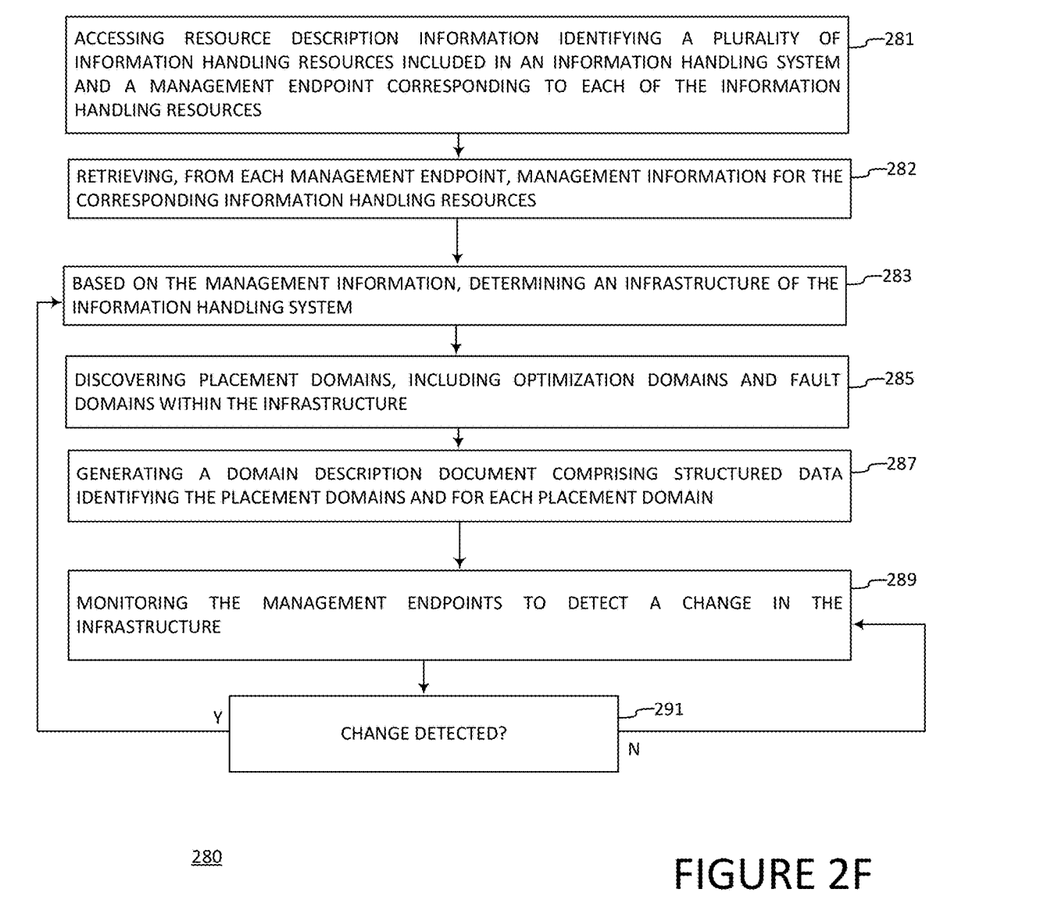
FIG. 2F illustrates a flow diagram of a method for discovering optimization and fault domains in an infrastructure managed system.

FIG. 2F illustrates a flow diagram of a method 280 for discovering and dynamically maintaining optimization and fault domain information for an infrastructure managed system. The method 280 illustrated in FIG. 2F includes accessing (block 281) resource description information. The resource description information may identify a plurality of information handling resources included in the infrastructure managed system and a management endpoint corresponding to each of the information handling resources. For each management endpoint, management information may be retrieved (block 282) for the corresponding information handling resource. Based on the management information, an infrastructure of the information handling system may be determined (block 283). Placement domains, including optimization domains and fault domains, may be discovered (block 285) within the infrastructure and a domain description document (block 287) that includes structured data identifying the placement domains for each placement domain. The management endpoints may be (block 289) monitored to detect any change in the infrastructure. Upon detecting an infrastructure change (block 291), the method 280 illustrated in FIG. 2F may return to block 283 to re-determine the infrastructure and the corresponding placement domains.

Figures 2G, 2G:
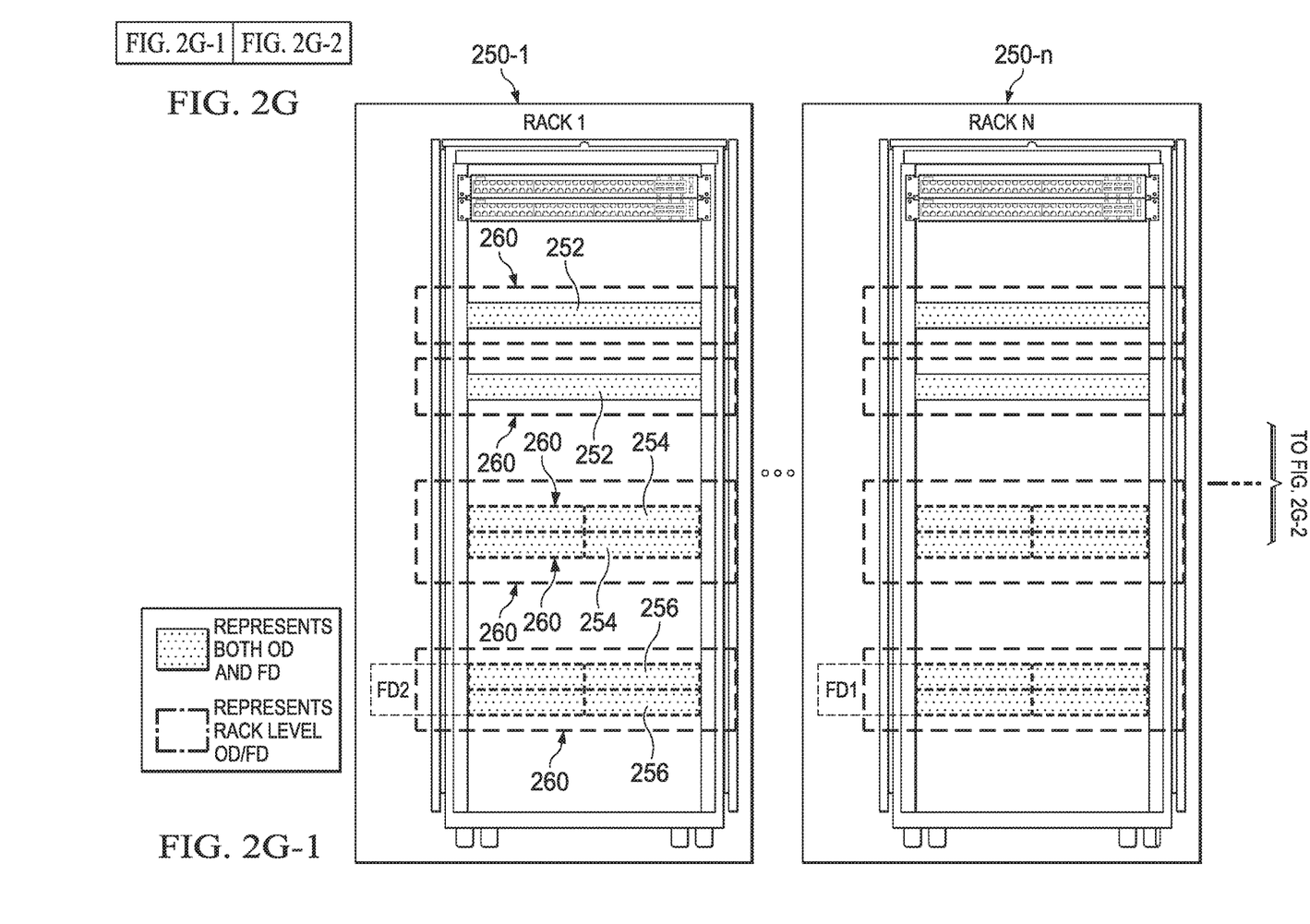
Figure 2G:
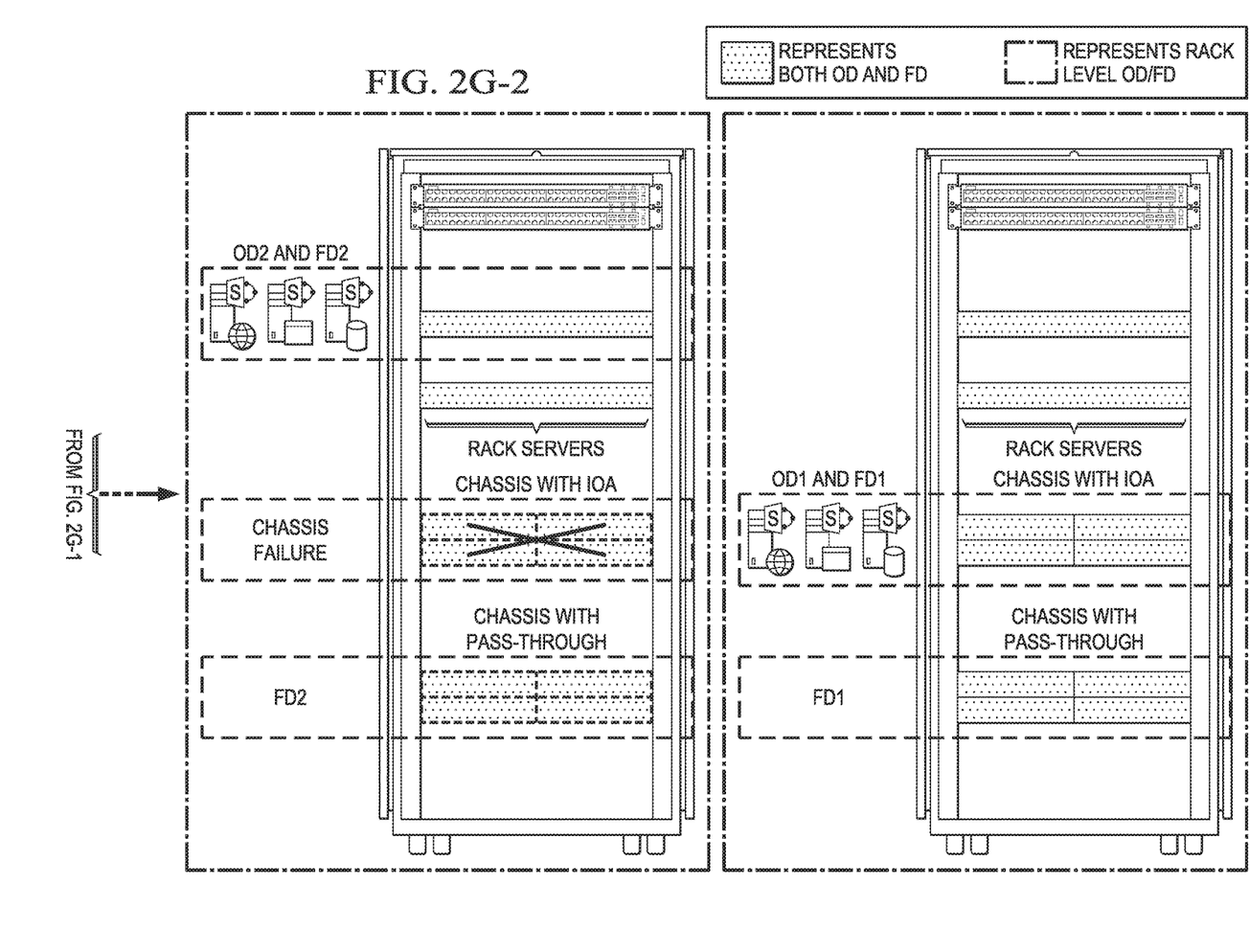

FIGS. 2G, 2G-1, and 2G-2 illustrate the multi-rack data center of FIG. 2 before and after an unintended infrastructure change corresponding to a failure of a modular chassis in RACK 1. FIGS. 2G, 2G-1, and 2G-2 illustrate that OD2 and FD2 have been re-defined following the modular chassis failure.

Figure 3A:
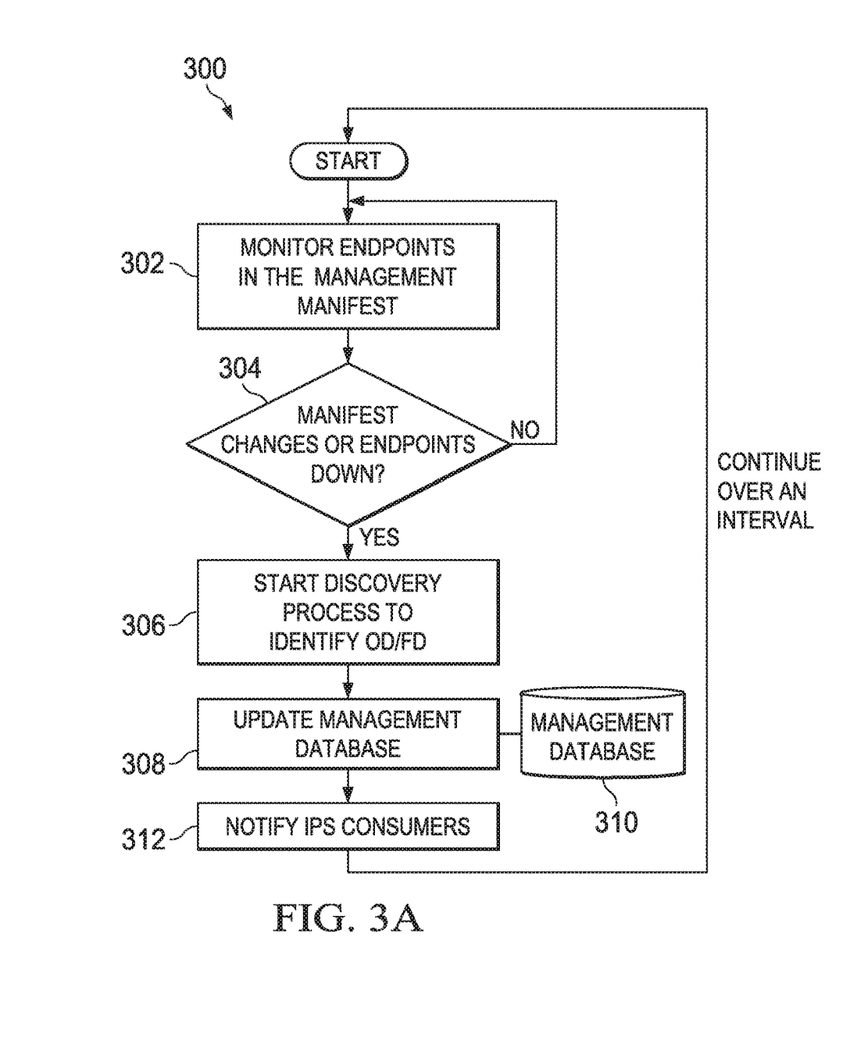
FIG. 3A illustrates a method for monitoring for infrastructure changes and re-determining optimization and fault domains when an infrastructure change is detected.
Figure 3B:
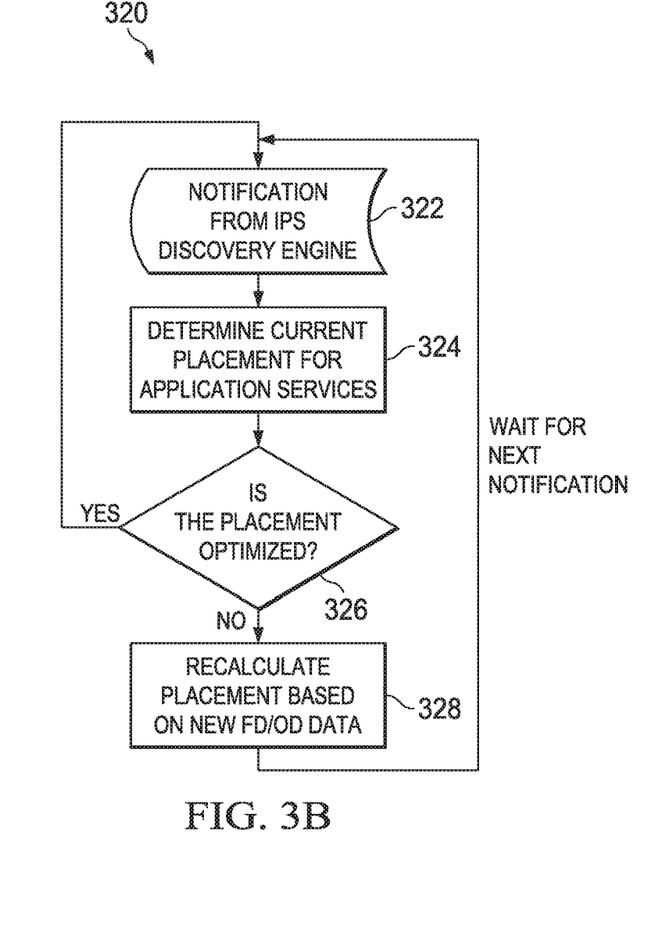
FIG. 3B illustrates a method for monitoring the placement of application services and recalculating placements when fault domains and optimization domains are updated.

FIG. 3A illustrates a flow diagram of an example method 300 and FIG. 3B illustrates a flow diagram of an example method 320 encompassing these operations. The method 300 illustrated in FIG. 3A includes monitoring (block 302) management endpoints indicated in the management manifest, and determining (block 304), whether any manifest changes have occurred or any endpoints have stopped functioning. If manifest changes, have occurred or end point functionality has changed, method 300 proceeds to block 306, in which a discovery process is started to identify optimization domains and fault domains. Any or all optimization domains and/or fault domains discovered may be recorded by updating (block 308) the management database, illustrated in FIG. 3A as management database 310. After the management database update completes, the method 300 illustrated in FIG. 3A may notify (block 312) IPS consumers.

FIG. 3B illustrates a flow diagram for an example method 320 for placing application services in accordance with fault and optimization domains. As illustrated in FIG. 3B, the placement of application services may begin when notification is received (block 322) from an IPS discovery engine. The infrastructure services manager may then determine (block 324) the current placement of application services and determine (block 326) whether the placement is optimized. If the placement is not optimized, the method 320 illustrated in FIG. 3B recalculates (block 328) the placement of application services when new fault domain/optimization domain data is received.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method of managing an information handling system, the method comprising:
  accessing resource description information identifying:
    a plurality of information handling resources included in the information handling system; and
    a plurality of management endpoints including a management endpoint for each of the plurality of information handling resources;
  retrieving management information for one or more of the information handling resources from one or more of the plurality of management endpoints;
  based on the management information, determining an infrastructure of the information handling system;
  discovering placement domains within the infrastructure, wherein said discovering includes at least one of:
  identifying an optimization domain, comprising a group of one or more of the information handling resources within which each of a plurality of tiers of an application service may be instantiated such that inter-tier communication:
    is internal to the optimization domain; and
    satisfies a communication performance criterion; and
  identifying a fault domain, comprising two or more independently available information handling resources;
  generating a domain description document indicative of:
    the placement domains, and, for each of the placement domains:
      a domain type; and
      one or more information handling resources included in the placement domain;
  detecting an infrastructure change based on at least one of:
    a resource status change indicated by one of the plurality of management endpoints; and
    a domain description change, comprising a change in the domain description document; and
  responsive to detecting the infrastructure change, re-discovering placement domains and re-generating the domain description document.

2. The method of claim 1, wherein the domain description document comprises structured data.

3. The method of claim 1, wherein accessing the resource description information includes accessing a resource description file comprising structured data indicative of:
  the plurality of information handling resources;
  the plurality of management endpoints; and a representational state transfer (REST) compliant protocol for a discovery interface for each of the plurality of information handling resources.

4. The method of claim 3, wherein retrieving management information from the plurality of management endpoints comprises:
invoking a protocol-specific adapter, corresponding to the REST compliant protocol, to:
provide credentials to and establish a connection with one or more of the plurality of management endpoints; and
request the management information from a management agent.

5. The method of claim 1, wherein identifying the optimization domain comprises:
identifying a plurality of conceivable optimization domains, wherein the plurality of conceivable optimization domains depends, at least in part, on an environment in which the application service is deployed, wherein the environment is selected from: a physical deployment environment, a virtual deployment environment, and a containerized deployment environment; and
selecting a best-achievable optimization domain from the plurality of conceivable optimization domains in accordance with available information handling resources and one or more optimization domain constraints.

6. The method of claim 5, wherein the one or more optimization domain constraints are selected from a group consisting of:
an symmetry constraint requiring symmetry between each of two or more instances of the application service instantiated on independently available resources within the fault domain; and
a level constraint requiring a particular fault domain level.

7. The method of claim 5, wherein identifying the fault domain comprises:
identifying a plurality of conceivable fault domains, wherein the plurality of conceivable fault domains depends, at least in part, on the environment in which the application service is deployed; and
selecting a best-achievable optimization domain from the plurality of conceivable optimization domains in accordance with available information handling resources and one or more fault domain constraints.

8. The method of claim 7, wherein the one or more fault domain constraints include a first fault domain constraint requiring the optimization domain having at least a threshold level of performance.

9. The method of claim 7, wherein the plurality of conceivable optimization domains include optimization domains selected from:
physical optimization domains, including:
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack;
virtual optimization domains, including:
a single module optimization domain comprising a single modular server within a modular chassis;
a single server optimization domain comprising a single rack mount server;
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack; and
containerized optimization domains, including:
a single module optimization domain comprising a single modular server within a modular chassis;
a single server optimization domain comprising a single rack mount server;
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack.

10. The method of claim 7, wherein the plurality of conceivable fault domains include fault domains selected from:
physical fault domains, including:
chassis level fault domains comprising independently operable resources on different modular chassis of a common rack;
rack level fault domains comprising independently operable resources on different racks within a data center; and
data center level fault domains comprising independently operable resources on different data centers;
fault domains for virtual deployments, including:
module level fault domains comprising independent operable resources on different modular servers of a single modular chassis;
chassis level fault domains comprising independently operable resources on different modular chassis of a common rack;
rack level fault domains comprising independently operable resources on different racks within a data center; and
data center level fault domains comprising independent data center level resources on different data centers.

11. An infrastructure services system comprising:
a processor; and
a non-transitory computer-readable medium, including processor-executable instructions that, when executed by the processor, cause the processor to perform operations comprising:
accessing a resource description file indicative of:
a plurality of information handling resources of an information handling system;
a plurality of management endpoints including one or more management endpoints corresponding to each of the plurality of information handling resources; and
a representational state transfer (REST) compliant protocol for a discovery interface for each of the plurality of information handling resources;
retrieving, from each of the plurality of management endpoints, management information for a corresponding information handling resource;

based on the management information, determining an infrastructure of the information handling system;
discovering placement domains within the infrastructure, wherein discovering the placement domains includes at least one of:
identifying an optimization domain, comprising a group of one or more of the information handling resources within which each of a plurality of tiers of an application service may be instantiated such that inter-tier communication:
is internal to the optimization domain; and
satisfies a communication performance criterion; and
identifying a fault domain, comprising two or more independently available information handling resources;
wherein retrieving management information from each management endpoint comprises:
invoking a protocol-specific adapter corresponding to the REST compliant protocol to:
provide credentials to the management endpoint to establish a connection with the management endpoint; and
request the management information from a management agent.

12. The information handling system of claim 11, wherein the operations include:
generating a domain description document comprising structured data identifying:
the placement domains and, for each placement domain:
a domain type; and
one or more information handling resources included in the placement domain.

13. The information handling system of claim 12, wherein the operations include:
detecting an infrastructure change based on at least one of:
a status change, for one of the plurality of information handling resources, indicated by an management endpoint; and
a domain description change, comprising a change in the domain description document; and
responsive to detecting the infrastructure change, re-discovering placement domains and re-generating the domain description document.

14. The information handling system of claim 11, wherein the resource description file comprises structured data indicative of:
the plurality of information handling resources;
the plurality of management endpoints; and
the REST compliant protocol for the discovery interface for each of the plurality of information handling resources.

15. The information handling system of claim 11, wherein identifying the optimization domain comprises:
identifying a plurality of conceivable optimization domains, wherein the plurality of conceivable optimization domains depends, at least in part, on an environment in which the application service is deployed, wherein the environment is selected from: a physical deployment environment, a virtual deployment environment, and a containerized deployment environment; and
selecting a best-achievable optimization domain from the plurality of conceivable optimization domains in accordance with available information handling resources and one or more optimization domain constraints.

16. The information handling system of claim 15, wherein the one or more optimization domain constraints are selected from a group consisting of:
a symmetry constraint requiring symmetry between each of two or more instances of the application service instantiated on independently available resources within the fault domain; and
an optimization domain constraint requiring a particular fault domain level.

17. The information handling system of claim 15, wherein identifying the fault domain comprises:
identifying a plurality of conceivable fault domains, wherein the plurality of conceivable fault domains depends, at least in part, on the environment in which the application service is deployed; and
selecting a best-achievable optimization domain from the plurality of conceivable optimization domains in accordance with available information handling resources and one or more fault domain constraints.

18. The information handling system of claim 17, wherein fault domain constraints include a level constraint requiring the optimization domain to have at least a threshold level of performance.

19. The information handling system of claim 17, wherein the plurality of conceivable optimization domains include optimization domains selected from:
optimization domains for physical deployments, including:
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack;
optimization domains for virtual deployments, including:
a single module optimization domain comprising a single modular server within a modular chassis;
a single server optimization domain comprising a single rack mount server;
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack; and
optimization domains for containerized deployments, including:
a single module optimization domain comprising a single modular server within a modular chassis;
a single server optimization domain comprising a single rack mount server;
a single chassis, multiple module optimization domain, wherein the single chassis includes aggregated I/O switching;
a single chassis, multiple module optimization domain, wherein the single chassis includes pass-through I/O switching; and
a single rack, multiple server optimization domain comprising a plurality of rack mount servers on a common rack.

20. The information handling system of claim 17, wherein the plurality of conceivable fault domains include fault domains selected from:
- fault domains for physical deployments, including:
- chassis level fault domains comprising independently operable resources on different modular chassis of a common rack;
- rack level fault domains comprising independently operable resources on different racks within a data center; and
- data center level fault domains comprising independently operable resources on different data centers;
- fault domains for virtual deployments, including:
- module level fault domains comprising independent operable resources on different modular servers of a single modular chassis;
- chassis level fault domains comprising independently operable resources on different modular chassis of a common rack;
- rack level fault domains comprising independently operable resources on different racks within a data center; and
- data center level fault domains comprising independent data center level resources on different data centers.

* * * * *